United States Patent
Kuo et al.

(10) Patent No.: US 8,036,169 B2
(45) Date of Patent: Oct. 11, 2011

(54) METHOD FOR IMPROVING HIGH-SPEED DOWNLINK OPERATION IN CELL_FACH STATE FOR A WIRELESS COMMUNICATIONS SYSTEM AND RELATED APPARATUS

(75) Inventors: Richard Lee-Chee Kuo, Taipei (TW); Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 913 days.

(21) Appl. No.: 12/029,360

(22) Filed: Feb. 11, 2008

(65) Prior Publication Data
US 2008/0192687 A1 Aug. 14, 2008

Related U.S. Application Data

(60) Provisional application No. 60/889,302, filed on Feb. 12, 2007.

(51) Int. Cl.
*H04W 4/00* (2009.01)
*H04W 36/00* (2009.01)
*H04L 12/28* (2006.01)

(52) U.S. Cl. ..... 370/329; 370/331; 370/431; 455/422.1; 455/436; 455/450

(58) Field of Classification Search .......... 370/329
See application file for complete search history.

(56) References Cited

U.S. PATENT DOCUMENTS

| 2005/0266846 A1 | 12/2005 | Kim |
| 2006/0183429 A1 | 8/2006 | Anderson |
| 2006/0199591 A1 | 9/2006 | Klatt |
| 2006/0240766 A1 | 10/2006 | Wilde |
| 2008/0188220 A1* | 8/2008 | DiGirolamo et al. ......... 455/434 |

FOREIGN PATENT DOCUMENTS

| CN | 1833452 A | 9/2006 |
| EP | 1418717 A1 | 5/2004 |
| EP | 1519595 A1 | 3/2005 |
| EP | 1 631 016 A1 | 3/2006 |
| EP | 1699253 A2 | 9/2006 |

(Continued)

OTHER PUBLICATIONS

LG Electronics: "MAC PDU Structure for HS-DSCH in CELL_FACH", 3GPP TSG-RAN WG2 #57, R2-070529, Feb. 15-19, 2007, St. Louis, USA.

(Continued)

*Primary Examiner* — Jeffrey Pwu
*Assistant Examiner* — Jasmine Myers
(74) *Attorney, Agent, or Firm* — Klein, O'Neill & Singh, LLP

(57) ABSTRACT

A method of improving a high-speed downlink operation in CELL_FACH state for a network terminal of a wireless communications system includes using a first function but not using a second function when a user equipment, hereinafter called UE, initiates a cell update procedure. The network terminal wirelessly communicates with the UE, and the network terminal and the UE both support the high-speed downlink operation in CELL_FACH state. The first function is used for allocating a dedicated HS-DSCH radio network transaction identifier (H-RNTI) to the UE, so as to manage the UE to perform the high-speed downlink operation in CELL_FACH based on the dedicated H-RNTI. The second function is used for not allocating the dedicated H-RNTI to the UE.

10 Claims, 4 Drawing Sheets

FOREIGN PATENT DOCUMENTS

| | | | |
|---|---|---|---|
| JP | 2002218531 A | 8/2002 | |
| JP | 2007531350 A | 11/2007 | |
| KR | 1020050082658 A | 8/2005 | |
| KR | 1020060123542 A | 12/2006 | |
| WO | 2005006829 A2 | 1/2005 | |
| WO | 2008084955 A1 | 7/2008 | |

OTHER PUBLICATIONS

LG Electronics: "Discussion on HS-FACH Operation", 3GPP TSG-RAN WG2 #56bis, R2-070284, Nov. 15-Jan. 19, 2007, Sorrento, Italy.

R2-070405 3GPP TSG-RAN WG2 Meeting #56bis, "Stage 2 updates for Enhanced CELL_FACH state in FDD", Aug. 1, 2007.

R2-070508 3GPP TSG-RAN WG2 Meeting #57, "Introduction of Enhanced CELL_FACH state (to RRC)", Jul. 2, 2007.

R2-070507 3GPP TSG-RAN WG2 Meeting,#57, "Introduction of HS-DSCH reception in CELL_FACH state", Jun. 2, 2007.

3GPP TS 25.331 V7.3.0 (Dec. 2006) Radio Resource Control (RRC); Protocol Specification (Release 7).

3GPP TS 25.321 V7.3.0 (Dec. 2006) Medium Access Control (MAC); Protocol Specification (Release 7).

3GPP TS 25.308 V7.5.0(Dec. 2007), Technical Specification, 3rd Generation Partnership Project; Technical Specification Group Radio Access Network; High Speed Downlink Packet Access (HSDPA); Overall description; Stage 2 (Release 7), p. 46-p. 49.

* cited by examiner

METHOD FOR IMPROVING HIGH-SPEED DOWNLINK OPERATION IN CELL_FACH STATE FOR A WIRELESS COMMUNICATIONS SYSTEM AND RELATED APPARATUS

CROSS REFERENCE TO RELATED APPLICATIONS

This application claims the benefit of U.S. Provisional Application No. 60/889,302, filed on Feb. 2, 2007 and entitled "Method And Apparatus for Improving HS-DSCH Reception in CELL_FACH State in a Wireless Communication System", the contents of which are incorporated herein by reference.

BACKGROUND OF THE INVENTION

1. Field of the Invention

The present invention relates to a method for improving a high-speed downlink operation for a wireless communications system and related communications device, and more particularly to a method for improving a cell update procedure used for a high-speed downlink operation in a CELL_FACH state for a wireless communications system and related communications device.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting at the third generation mobile telecommunication technology, the 3rd Generation Partnership Project (3GPP) provides High Speed Package Access (HSPA) technology, which includes High Speed Downlink Package Access (HSDPA) and High Speed Uplink Package Access (HSUPA), to increase bandwidth utility rate and package data processing efficiency so as to improve uplink/downlink transmission rate.

On the basis of HSDPA, the 3GPP launches High Speed Downlink Shared Channel reception in CELL_FACH state, which is abbreviated to HS-DSCH reception in CELL_FACH state, and CELL_FACH state is well known as one of radio resource control (RRC) states. HS-DSCH reception in CELL_FACH state allows a user equipment (UE) monitoring the HS-DSCH for downlink data reception with cooperation of related control channel, namely Shared Control Channel for HS-DSCH (HS-SCCH), so as to improve peak data rate, signaling delay, state transition delay and flexible cell capacity.

A UMTS radio access network (UTRAN) enables HS-DSCH reception in CELL_FACH state by means of the system information broadcast, and related parameters correspond to HS-SCCH and HS-DSCH configuration and a common HS-DSCH radio network transaction identifier (Common H-RNTI).

The parameters corresponding to the common H-RNTI provides multiple common H-RNTIs values for the UE to select. For the UE in idle mode, the parameters are obtained from a "Downlink HS-PDSCH system information" information element (IE), included in a system information block (SIB) type 5/5bis. For the UE in the RRC connected mode, the parameters are obtained from a "Downlink HS-PDSCH system information for connected mode" IE, included in a SIB type 6. On the other hand, the UE includes a common H-RNTI variable for storing the selected common H-RNTI. Each common H-RNTI is shared by several UEs for grouping the UEs in the same cell, and also represents an identity of the UEs in the same group.

In addition to the common H-RNTIs, the UE may use a dedicated H-RNTI for HS-DSCH reception in CELL_FACH state. Each dedicated H-RNTI only represents the identity of a specific UE. Through an cell update procedure initiated by the UE, the UTRAN can determines to use a first function or a second function for allocating a dedicated H-RNTI to the UE or not.

When the UE reselects a new cell and settles in the cell, the UE has to initiate a cell update procedure and enter CELL_FACH state for notifying the UTRAN of related changes of the communications circumstance. The exchange of RRC messages related to the cell procedure is described as follows. Firstly, the UE sends a CELL UPDATE message to the UTRAN. In addition to cell reselection, several situations, such as radio link failure and an RLC unrecoverable error, also require the UE to initiate the cell update procedure. If the CELL UPDATE message notifies the UTRAN that the reason of procedure initiation is radio link failure, the UTRAN sends an RRC CONNECTION RELEASE message to indicate the UE to re-make an RRC connection. IF the procedure is initiated due to other reasons (i.e. cell reselection), the UTRAN sends a CELL UPDATE CONFIRM message via a dedicated control channel (DCCH) or a common control channel (CCCH). The CELL UPDATE CONFIRM message may includes different configuration data, and the UE feedbacks with different messages according to the configuration data, so as to perform radio bearer reconfiguration or releasing, mobile information update or transport channel reconfiguration.

If the UTRAN uses the first function for the cell update procedure, a New H-RNTI IE is set with a dedicated H-RNTI and then included in the CELL UPDATE CONFIRM message. On the other hand, the UE owns an H-RNTI variable for storing the settings of the dedicated H-RNTI. If the UTRAN uses the second function, no New H-RNTI IE is included in the CELL UPDATE CONFIRM message, and the UE continues using the original common H-RNTI.

The UE can activate or deactivate the HS-DSCH reception in CELL_FACH state by determining a HS_DSCH_RECEPTION_CELL_FACH_STATE variable. When the UE enters CELL_FACH state and also activates HS-DSCH reception, the UE uses the dedicated H-RNTI if the H-RNTI variable is set. Otherwise, the common H-RNTI is used. Thus, if the UE selects a new cell, the UE keeps using the common H-RNTI for HS-DSCH reception in CELL_FACH state.

For a transmission packet header, except for the headers mapped to HS-DSCH or enhanced dedicated channel (E-DCH), a media access control (MAC) layer defines five fields as follows: Target Channel Type Field (TCTF), C/T, UE Id, UE Id Type and MBMS Id. The UE Id and UE Id Type fields are both used for providing an identifier of the UE so that the UE can identify the packets belonging to it.

In the MAC layer of the UTRAN, a MAC-d protocol data unit (PDU) adopts different header formats based on the different transport channels, and thereby is formed into a MAC-d service data unit (MAC-d SDU).

In addition, a MAC-ehs PDU includes a plurality of concatenated MAC-d PDUs and is transmitted on HSDSCH. A header of the MAC-ehs PDU consists of Logic channel identity (LCH-ID), Length (L), Transmission Sequence Number (TSN) and Flag fields. In general, the MAC-ehs PDU is applied to the UE in CELL_DCH state for the HSDPA operation and thereby each UE has a dedicated H-RNTI. Therefore, the MAC-ehs PDU can be sent to the targeting UE without including any UE identity information.

In the prior art, the UE using the common H-RNTI has to identify the received MAC packets with the headers and thereby determines to discard the packets or take a next process for dissembling the packets. On the contrary, the UE using the dedicated H-RNTI does not need the packet-identifying step. However, as can be seen from the above, the UE Id and UE Id Type fields, which carry identifiers of the targeting UE/UEs, are included neither in the MAC-d PDUs nor in the MAC-ehs PDUs. In this situation, the UE, who uses the common H-RNTI for HS-DSCH reception in CELL_FACH state, has no way to identify the received MAC packets. Thus, the reception of the MAC packets in MAC-d PDUs is impossible.

In brief, the UTRAN of the prior art can use the first or second function during the cell update procedure, so as to manage the UE to use the dedicated or common H-RNTI for HS-DSCH reception in CELL_FACH state However, the UE using common H-RNTI fails in reception of MAC packets in MAC-d PDUs sent on the HS-DSCH.

SUMMARY OF THE INVENTION

The present invention therefore provides a method of improving a cell update procedure related to a high-speed downlink operation in a CELL_FACH state for a wireless communications system and related communications device that ensures a UL performs the high-speed downlink operation according to a dedicated H-RNTI.

The present invention discloses a method of improving a high-speed downlink operation in CELL_FACH state for a network terminal of a wireless communications system. The network terminal wirelessly communicates with a UE, and the network terminal and the UE both support the high-speed downlink operation in CELL_FACH state. The method includes using a first function but not using a second function when the UE initiates a cell update procedure due to cell reselection. The first function is used for allocating a dedicated H-RNTI to the UE, so as to manage the UE to perform the high-speed downlink operation in CELL_FACH based on the dedicated H-RNTI. The second function is used for not allocating the dedicated H-RNTI to the UE.

The present invention further discloses a communications device of a wireless communications system for improving a high-speed downlink operation in CELL_FACH state to prevent a UE from failing in reception of downlink packets. The communications device wirelessly communicates with the UE, and the communications device and the UE both support the high-speed downlink operation in CELL_FACH state. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes using a first function but not using a second function when the UE initiates a cell update procedure due to cell reselection. The first function is used for allocating a dedicated H-RNTI to the UE, so as to manage the UE to perform the high-speed downlink operation in CELL_FACH based on the dedicated H-RNTI. The second function is used for not allocating the dedicated H-RNTI to the UE.

The present invention discloses a method of improving a high-speed downlink operation in CELL_FACH state for a UE of a wireless communications system. The UE wirelessly communicates with a network terminal, and the network terminal and the UE both support the high-speed downlink operation in CELL_FACH state. The method includes selecting a new cell; initiating a cell update procedure; receiving a CELL UPDATE CONFIRM message from the network terminal; performing the high-speed downlink operation according to a dedicated H-RNTI when the CELL UPDATE CONFIRM message comprises the dedicated H-RNTI; determining the CELL UPDATE CONFIRM message to be invalid when the CELL UPDATE CONFIRM message does not comprise the dedicated H-RNTI.

The present invention further discloses a communications device of a wireless communications system for improving a high-speed downlink operation in CELL_FACH state to prevent from failing in reception of downlink packets. The communications device wirelessly communicates with a network terminal, and the communications device and the network terminal both support the high-speed downlink operation in CELL_FACH state. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes selecting a new cell; initiating a cell update procedure; receiving a CELL UPDATE CONFIRM message from the network terminal; performing the high-speed downlink operation according to a dedicated H-RNTI when the CELL UPDATE CONFIRM message comprises the dedicated H-RNTI; and determining the CELL UPDATE CONFIRM message to be invalid when the CELL UPDATE CONFIRM message does not comprise the dedicated H-RNTI.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
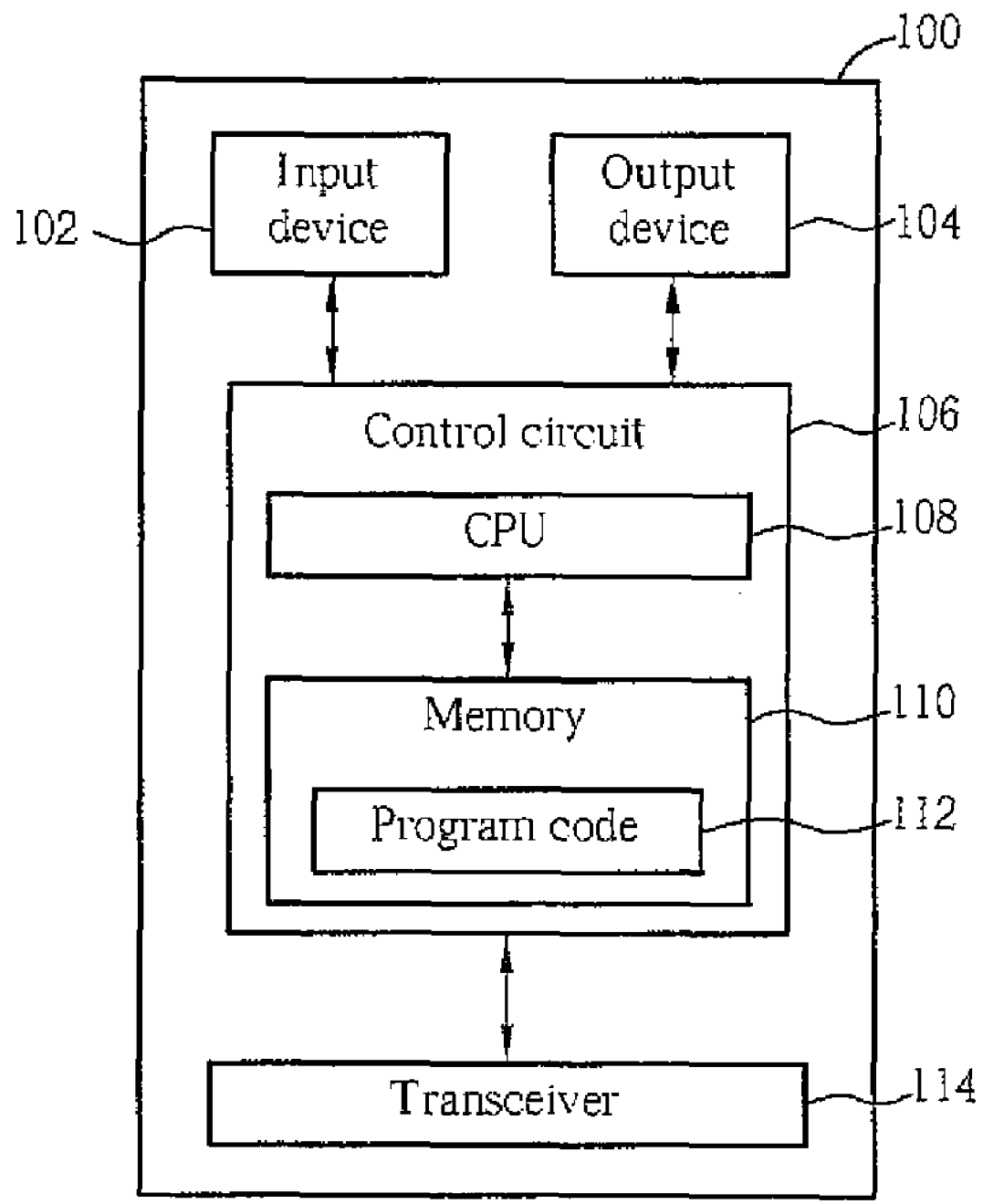
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a High Speed Package Access (HSPA) system of the third generation (3G) mobile communications system and also supports high-speed downlink operation in CELL_FACH state, which is preferably HS-DSCH reception in CELL_FACH state.

Figure 2:
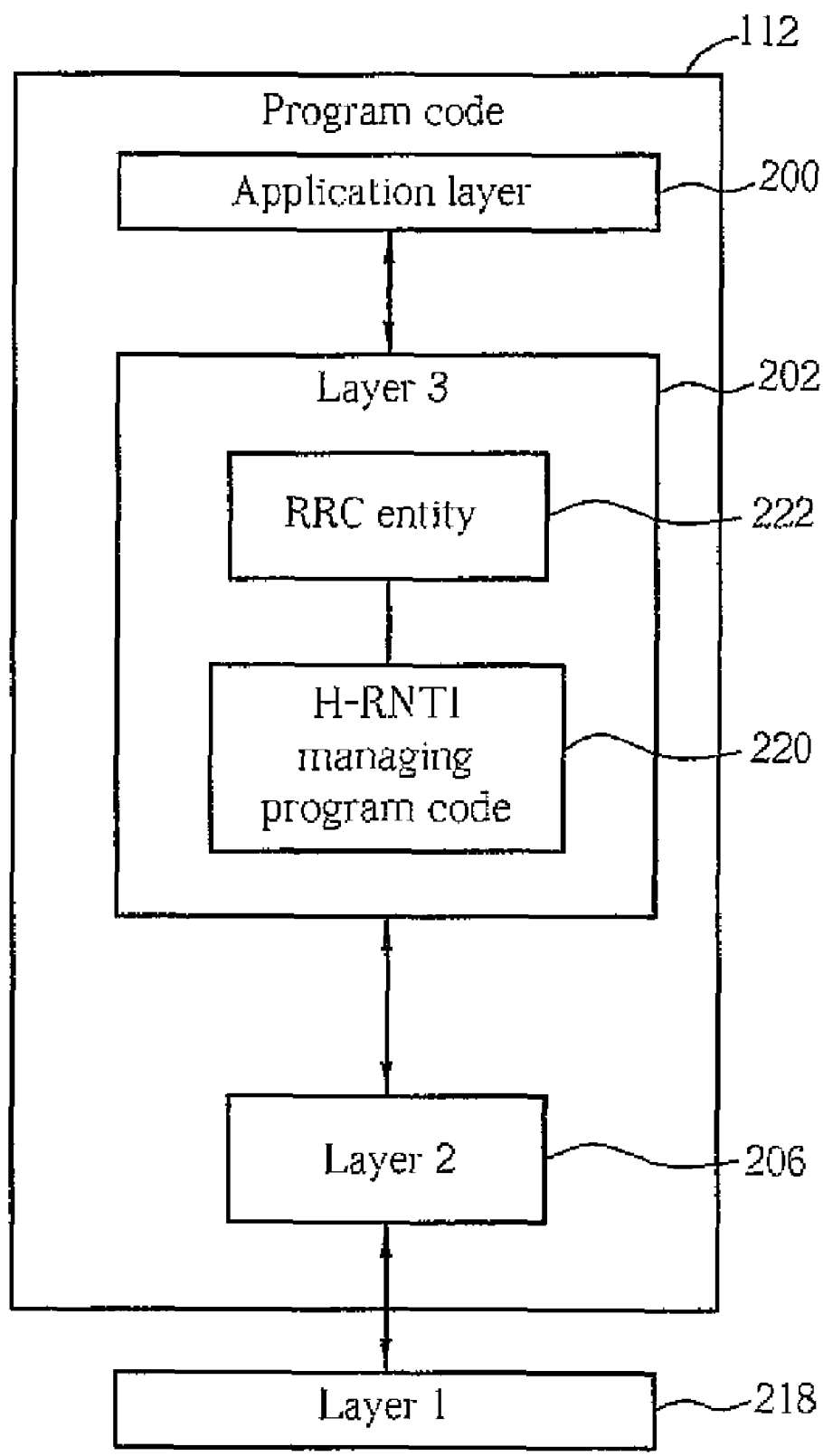
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 3 202 includes a radio resource control (RRC) entity 222 for controlling the Layer 1 218 and the Layer 2 206. The Layer 2 206 includes a media access control (MAC) layer for processing MAC-ehs protocol data units (PDUs).

The communications device 100 can be a UTRAN or a UE. When the communications device 100 is applied to the UTRAN wirelessly communicating with the UE, the RRC entity 222 provides the UE with configuration corresponding to HS-DSCH reception in CELL_FACH state through a cell update procedure. The MAC layer in the Layer 2 206 generates and sends MAC-ehs PDUs to the UE via HS-DSCH.

When the communications device 100 is applied to the UE, the RRC entity 222 can initiate the cell update procedure to receive the configuration corresponding to HS-DSCH reception in CELL_FACH state from the UTRAN. In addition, the RRC entity 222 can switch the communications device 100 among the idle mode, CELL_PCH, URA_PCH, CELL_FACH and CELL_DCH states. The communications device 100 in CELL_FACH state can activate or deactivate HS-DSCH reception in CELL_FACH state by determining an HS_DSCH_RECEPTION_CELL_FACH_STATE variable, and indicates the layer 2 206 to receive the MAC-ehs PDUs via HS-DSCH.

Figure 3:
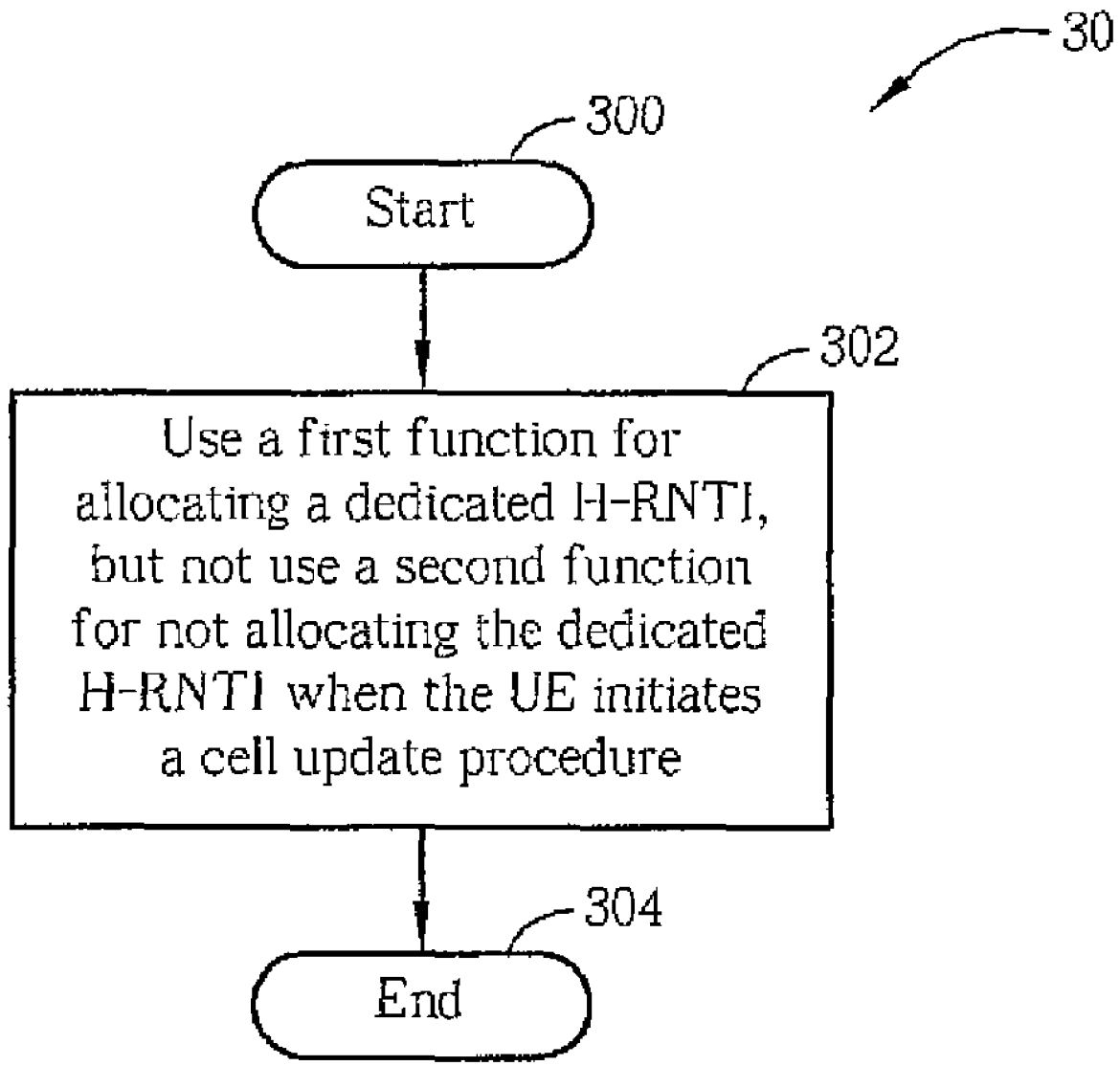
FIG. 3 is a flowchart diagram of a process according to an embodiment of the present invention.

In this situation, the embodiment of the present invention provides an H-RNTI managing program code 220 to manage the UE identity to prevent the UE from failing in reception of downlink data of HS-DSCH reception in CELL_FACH state. Please refer to FIG. 3, which illustrates a schematic diagram of a process 30 according to an embodiment of the present invention. The process 30 is utilized for improving a high-speed downlink operation in CELL_FACH state for a UTRAN of a wireless communications system, and can be compiled into the H-RNTI managing program code 220. The process 30 includes the following steps:

Step 300: Start.
Step 302: Use a first function for allocating a dedicated H-RNTI, but not use a second function for not allocating the dedicated H-RNTI when the UE initiates a cell update procedure.
Step 304: End.

Figure 4:
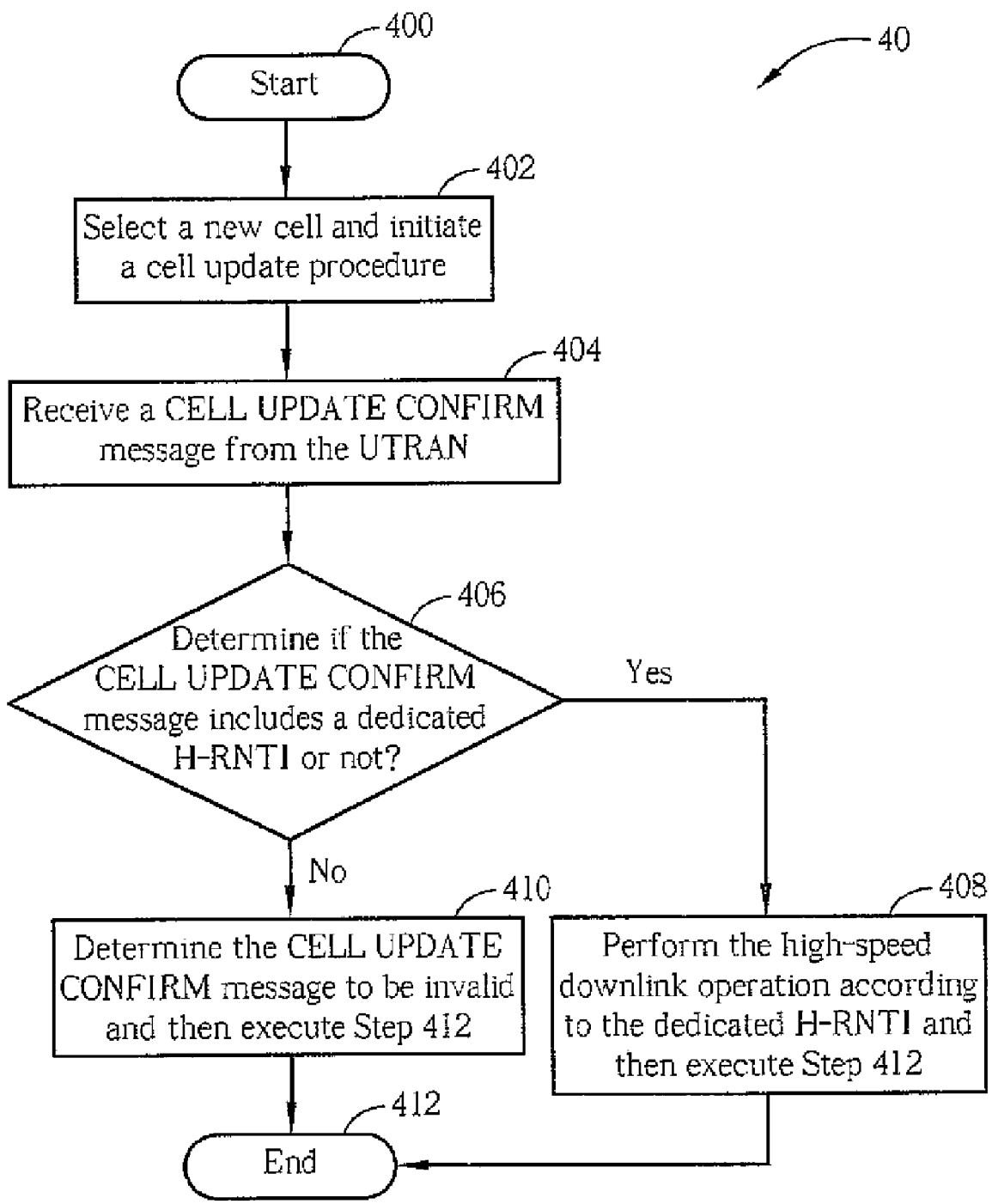
FIG. 4 is a flowchart diagram of a process according to an embodiment of the present invention.

In addition, please refer to FIG. 4, which illustrates a schematic diagram of a process 40 according to an embodiment of the present invention. The process 40 is applied to a UE of a wireless communications system for cooperating with the process 30 to improve the high-speed downlink operation in CELL_FACH state. The process 40 can be compiled into the H-RNTI managing program code 220 and includes the following steps:

Step 400: Start.
Step 402: Select a new cell and initiate a cell update procedure.
Step 404: Receive a CELL UPDATE CONFIRM message from the UTRAN.
Step 406: Determine if the CELL UPDATE CONFIRM message includes a dedicated H-RNTI or not: If so, execute Step 408; if not, execute 410.
Step 408: Perform the high-speed downlink operation according to the dedicated H-RNTI and then execute Step 412.
Step 410: Determine the CELL UPDATE CONFIRM message to be invalid and then execute Step 412.
Step 412: End.

According to the processes 30 and 40, when the UE selects the new cell, the UE initiates the Cell update procedure and thereby sends a CELL UPDATE message for notifying the UTRAN of related changes of configuration and the communications status. When the CELL UPDATE message is received, the UTRAN always uses the first function to allocate a dedicated H-RNTI to the UE for HS-DSCH reception in CELL_FACH state. Preferably, the UTRAN firstly sets a New H-RNTI IE with the dedicated H-RNTI and includes the New H-RNTI IE in the CELL UPDATE CONFIRM message, and then sends the message to the UE. On the contrary, the second function for not allocating the dedicated H-RNTI to the UE is never used.

On the other hand, the UE receives the CELL UPDATE CONFIRM message via the common control channel (CCCH) and then determines if the message includes the dedicated H-RNTI or not. Preferably, the UE determines if the received CELL UPDATE CONFIRM message includes a New H-RNTI IE or not. If so, the UE stores the dedicated H-RNTI and thereby indicates the MAC layer to receive MAC packets via HS-DSCH according to the dedicated H-RNTI. Otherwise, the UE determines that the CELL UPDATE CONFIRM message is invalid and thereby notifies the UTRAN that an error occurs in the cell update procedure.

Therefore, through cooperation of the processes 30 and 40, the UE always uses the dedicated H-RNTI for HS-DSCH reception in CELL_FACH state.

In conclusion, according to the prior art cell update procedure, the UTRAN can use the first function, which allows the UE to use a dedicated H-RNTI for HS-DSCH reception in CELL_FACH state. Alternatively, the UTRAN can use the second function, which allows the UE using a common H-RNTI. Under the situation of cell reselection, the UE using the common H-RNTI cannot receive the downlink MAC packets in MAC-d PDUs due to no UE Id information in the MAC packets. Compared with the prior art, the embodiment of the present invention always allocates the dedicated H-RNTI to the UE during the cell update procedure, thereby ensuring that the UE can receive downlink data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method of improving a high-speed downlink operation in CELL_FACH state for a user equipment, hereinafter called UE, of a wireless communications system, the UE wirelessly communicating with a network terminal, the network termi- nal and the UE both supporting the high-speed downlink operation in CELL_FACH state, the method comprising:
- selecting a new cell;
- initiating a cell update procedure;
- receiving a CELL UPDATE CONFIRM message from the network terminal;
- performing the high-speed downlink operation according to a dedicated HS-DSCH radio network transaction identifier, hereinafter called H-RNTI, when the CELL UPDATE CONFIRM message comprises the dedicated H-RNTI; and
- determining the CELL UPDATE CONFIRM message to be invalid when the CELL UPDATE CONFIRM message does not comprise the dedicated H-RNTI.

2. The method of claim 1, wherein performing the high-speed downlink operation according to the dedicated H-RNTI when the CELL UPDATE CONFIRM message comprises the dedicated H-RNTI is performing the high-speed downlink operation according to the dedicated H-RNTI when the CELL UPDATE CONFIRM message comprises a New H-RNTI information element, hereinafter called IE, and determining the CELL UPDATE CONFIRM message to be invalid when the CELL UPDATE CONFIRM message does not comprise the dedicated H-RNTI is determining the CELL UPDATE CONFIRM message to be invalid when the CELL UPDATE CONFIRM message does not comprise the New H-RNTI IE, where the New H-RNTI IE is used for carrying settings corresponding to the dedicated H-RNTI.

3. The method of claim 2 further comprising receiving the CELL UPDATE CONFIRM message via a common control channel, abbreviated to CCCH.

4. The method of claim 1 further comprising notifying the network terminal that an error occurs in the cell update procedure when the CELL UPDATE CONFIRM message is determined to be invalid.

5. The method of claim 1, wherein the high-speed downlink operation comprises a high speed downlink shared channel, known as HS-DSCH, reception operation.

6. A communications device used in a wireless communications system for improving a high-speed downlink operation in CELL_FACH state to prevent from failing in reception of downlink packets, the communications device wirelessly communicating with a network terminal, the communications device and the network terminal both supporting the high-speed downlink operation in CELL_FACH state, the communications device comprising:
- a control circuit for realizing functions of the communications device;
- a central processing unit coupled to the control circuit for executing a program code to operate the control circuit; and
- a memory coupled to the central processing unit for storing the program code;
- wherein the program code comprises:
  - selecting a new cell;
  - initiating a cell update procedure;
  - receiving a CELL UPDATE CONFIRM message from the network terminal;
  - performing the high-speed downlink operation according to a dedicated HS-DSCH radio network transaction identifier, hereinafter called H-RNTI, when the CELL UPDATE CONFIRM message comprises the dedicated H-RNTI; and
  - determining the CELL UPDATE CONFIRM message to be invalid when the CELL UPDATE CONFIRM message does not comprise the dedicated H-RNTI.

7. The communications device of claim 6, wherein performing the high-speed downlink operation according to the dedicated H-RNTI when the CELL UPDATE CONFIRM message comprises the dedicated H-RNTI is performing the high-speed downlink operation according to the dedicated H-RNTI when the CELL UPDATE CONFIRM message comprises a New H-RNTI information element, hereinafter called IE, and determining the CELL UPDATE CONFIRM message to be invalid when the CELL UPDATE CONFIRM message does not comprise the dedicated H-RNTI is determining the CELL UPDATE CONFIRM message to be invalid when the CELL UPDATE CONFIRM message does not comprise the New H-RNTI IE, where the New H-RNTI IE is used for carrying settings corresponding to the dedicated H-RNTI.

8. The communications device of claim 7, wherein the program code further comprising receiving the CELL UPDATE CONFIRM message via a common control channel, abbreviated to CCCH.

9. The communications device of claim 6, wherein the program code further comprises notifying the network terminal that an error occurs in the cell update procedure when the CELL UPDATE CONFIRM message is determined to be invalid.

10. The communications device of claim 6, wherein the high-speed downlink operation comprises a high speed downlink shared channel, known as HS-DSCH, reception operation.

* * * * *